United States Patent [19]
Alsup et al.

[11] 3,831,013
[45] Aug. 20, 1974

[54] CORRELATORS USING SHIFT REGISTERS

[75] Inventors: James M. Alsup; Harper John Whitehouse, both of San Diego, Calif.

[73] Assignee: The United States of America as represented by the Secretary of the Navy, Washington, D.C.

[22] Filed: Feb. 20, 1973

[21] Appl. No.: 333,608

[52] U.S. Cl. ............ 235/181, 235/150.53, 235/177, 328/37
[51] Int. Cl. ............ G06g 7/19
[58] Field of Search ............ 235/181, 150.53; 340/347 DA

[56] References Cited

UNITED STATES PATENTS

| | | | |
|---|---|---|---|
| 3,303,335 | 2/1967 | Pryor | 235/181 |
| 3,495,237 | 2/1970 | Le Corre et al. | 340/347 DA |
| 3,582,943 | 6/1971 | Weller | 340/347 DA |
| 3,670,151 | 6/1972 | Lindsay et al. | 235/181 |

*Primary Examiner*—Felix D. Gruber
*Attorney, Agent, or Firm*—Richard S. Sciascia; Ervin F. Johnston; John Stan

[57] ABSTRACT

A correlator comprising a plurality of sets of multivibrators, each set being serially connected to form a shift register, each multivibrator having a set and a reset output lead, indicating its binary state. The plurality of shift registers comprise a J number of signal shift registers and, in the simplest embodiment, one reference shift register. Each multivibrator is connectable to a clocking source for shifting the states of the multivibrators. One of the multivibrators of each set, at one end of the series, the input multivibrator, is connectable to a source of signals, generally bilevel signals or pulses, each pulse having a predetermined time duration or a multiple thereof. The binary states of the multivibrators of the reference shift register, whether stationary or shifting with the incoming stream of bits, may be added to the binary states of corresponding multivibrators of the signal shift registers. Means are operatively connected to the output leads of corresponding multivibrators for summing the outputs of the multivibrators for each shift of binary states, the sum being a maximum for a particular combination, or coding, of binary states of the multivibrators of the shift registers. The means may comprise a plurality of modulo-2 adders, one for each of the multivibrators of the signal shift registers, and the same number of output resistors. The specific combination of connections are chosen in a manner so that, with applied input signals to the input multivibrators, a particular combination of binary states of the multivibrators will result in a maximum total output signal.

5 Claims, 10 Drawing Figures

CORRELATOR FOR 3-DIGIT SIGNAL VERSUS 3-DIGIT REFERENCE.

(PRIOR ART) BASIC BINARY CORRELATOR USING ONE SIGNAL AND ONE REFERENCE SHIFT REGISTER.

CORRELATOR USING A PLURALITY OF SIGNAL SHIFT REGISTERS BUT ONLY ONE REFERENCE SHIFT REGISTER.

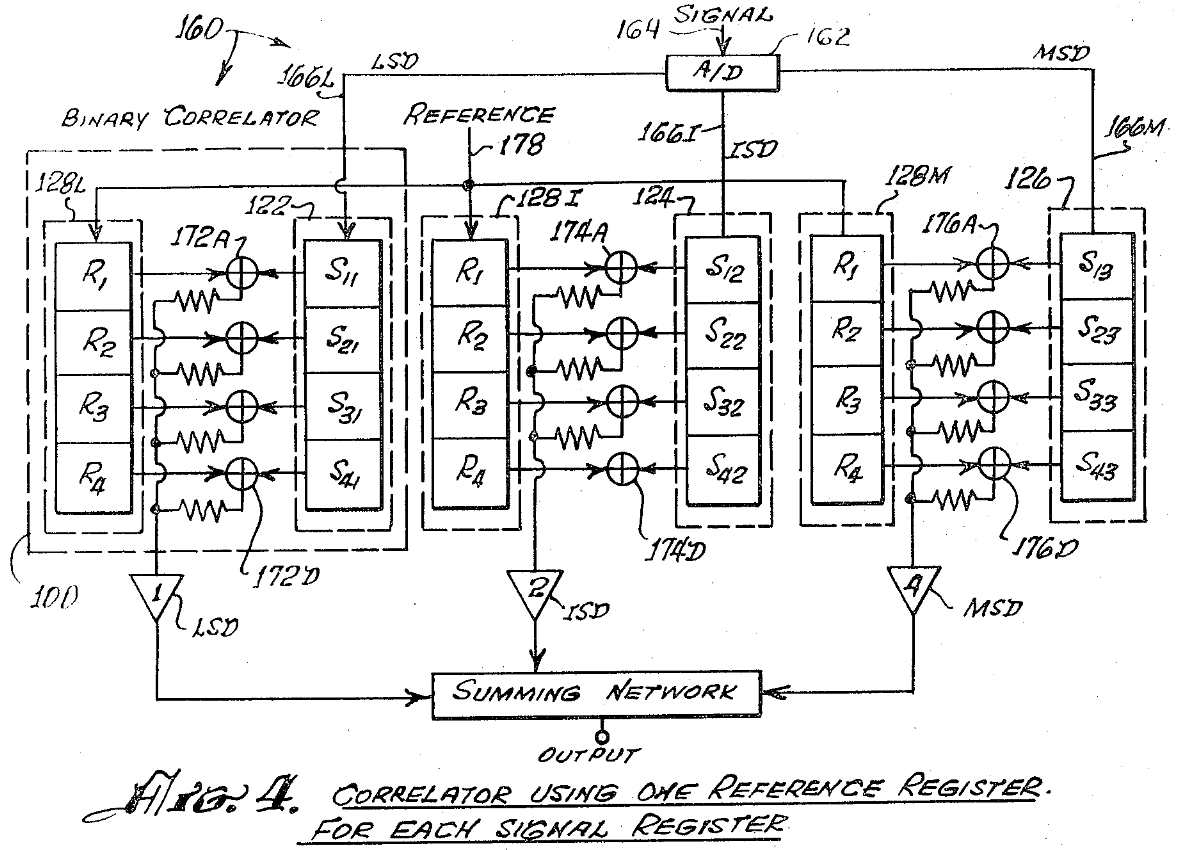
FIG. 4. CORRELATOR USING ONE REFERENCE REGISTER FOR EACH SIGNAL REGISTER
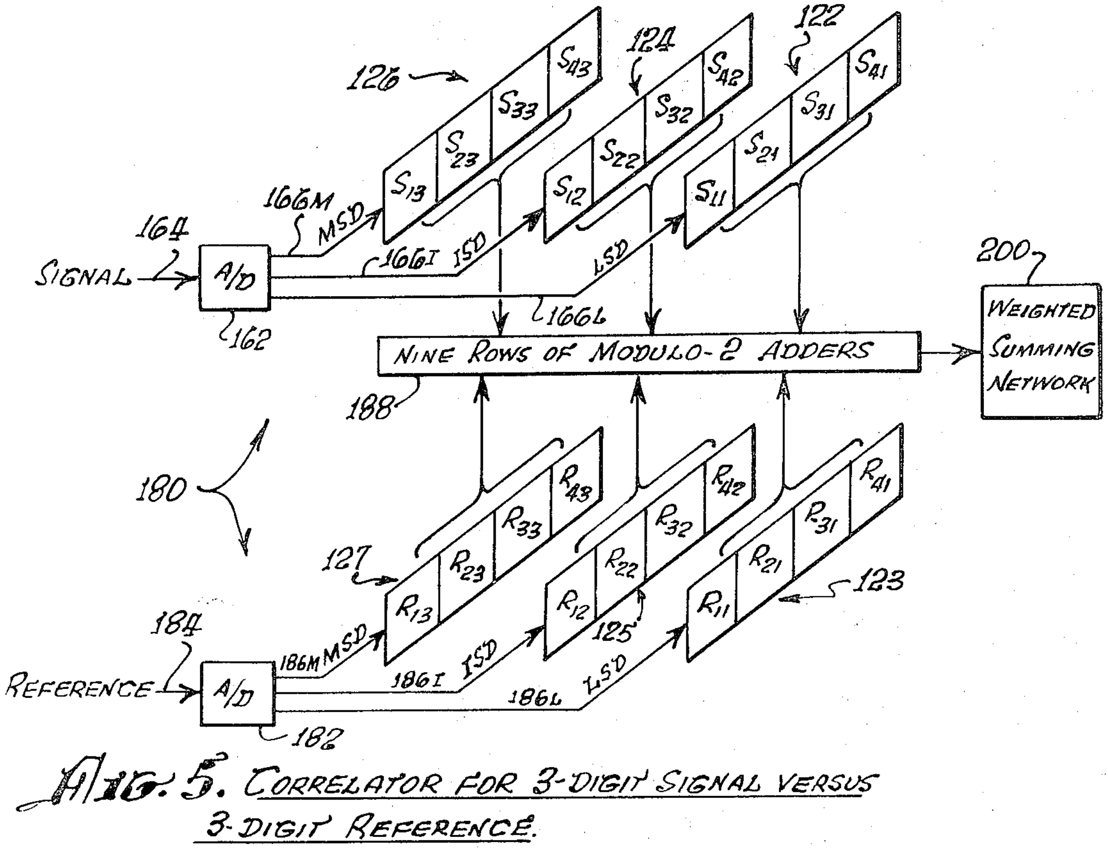
FIG. 5. CORRELATOR FOR 3-DIGIT SIGNAL VERSUS 3-DIGIT REFERENCE.

OUTPUT RESISTIVE NETWORK FOR CORRELATOR WITH MULTILEVEL SIGNAL AND REFERENCE SHIFT REGISTERS.

ANALOG-SIGNAL, MULTILEVEL-QUANTIZED REFERENCE CORRELATOR.

CORRELATORS USING SHIFT REGISTERS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to correlators of various types utilizing shift registers as an essential element. The term "correlator" as used herein includes auto-correlators, cross-correlators, convolvers and matched filters. All of the embodiments illustrated utilize one, or several, reference shift registers, and two or more signal shift registers or a tapped delay line every shift register having the same number of multivibrators.

In the prior art, there are various types of correlators. Some use multiple filter sections, utilizing discrete filter elements. For pulse-type signals, recently developed matched filters utilize uniformly spaced magnetic interaction stations wherein tiny magnets are polarized, either electrically or permanently, in one of two opposite directions.

SUMMARY OF THE INVENTION

In its simplest form, the digital correlator of the prior art takes the form of a binary correlator, this is shown in FIG. 1. This correlator consists of two serial-in, parallel-out shift registers with K stages, a signal shift register and a reference shift register, a group of K exclusive/OR circuits, or modulo-2 adders, and an analog summing network. The outputs at corresponding stages of the two shift registers form pairs of inputs for the exclusive/OR circuits, so that K mod-2 sums are formed simultaneously by these exclusive/ORs. These exclusive/OR outputs are summed via an analog network whose total output represents the number of agreements minus the number of disagreements for the contents of the two shift registers, and changes whenever new information is shifted into either register.

When one of two sampled-data signals is quantized to J bits while a second signal is represented as a binary sequence (clipped), a more complex structure, such as that shown in FIG. 4 can be used to correlate the two signals. This structure consists of three binary correlators of the type just described, arranged so that one channel of each correlator propagates the binary reference signal while each of the second, signal channels is assigned to propagate one of the three multilevel-signal digits. The three binary-vs-binary outputs are then weighted according to digit level and summed for the final output.

In an equivalent structure, shown in FIG. 2, two (in general, J-1) reference shift registers are eliminated at the expense of not using binary correlators in the assembly.

When both sampled-data signals are quantized, one to J-bits and the other to N-bits, there are three digital structures which can be used to obtain the correlation function. One of these is illustrated in FIG. 5 (J=N=3), where J+N shift registers are used to store and propagate the two signals while J·N groups of K exclusive/OR circuits are used to obtain the appropriate mod-2 sums. These exclusive/OR outputs are then weighted and summed in an output resistive network such as that described in FIG. 6.

A second more simple, structure utilized N modules of the type shown in FIG. 2 so that the reference shift register in each module is assigned to propagate one of the N quantization digits of the N-bit signal while the set of J shift registers in each module are required to carry the same J-bit signal simultaneously. The individual module outputs are weighted and summed in a network equivalent to that shown on the right-hand side of FIG. 3B.

A third structure extends the concept utilized in FIG. 4 such that J·N binary correlators are used to propagate the J+N signal bits and obtain the J·N binary correlation functions needed to synthesize the J-bit-vs-N-bit correlation function. The synthesis can be performed in a network such as that represented by the middle and right-hand portions of FIG. 6.

It should be noted that the second structure contains (N-1)J additional shift registers, and the third structure contains (N-1)J + (J-1)N additional shift registers as compared to the first structure. This represents a considerable redundancy in hardware for large values of J and N, but may still be practical in certain cases. For instance, if digital correlators of the required speed and capacity are readily available only in binary modules, the third structure might be built more quickly and perhaps less expensively than the first or second structures.

STATEMENT OF THE OBJECTS OF THE INVENTION

An object of the present invention is the provision of improved correlators, having a plurality of signal channels and one or more reference channels, whose primary elements are shift registers.

Another object is to provide a correlator structure utilizing any number of parallel shift registers, one for the most significant digit, another shift register for the least significant digit, and other shift registers for handling significant digits intermediate in value to these two.

Still another object is the provision of a correlator structure adaptable for implementation by integrated circuitry.

Other objects, advantages and novel features of the invention will become apparent from the following detailed description of the invention, when considered in conjunction with the accompanying drawings,wherein.

Figure 2:
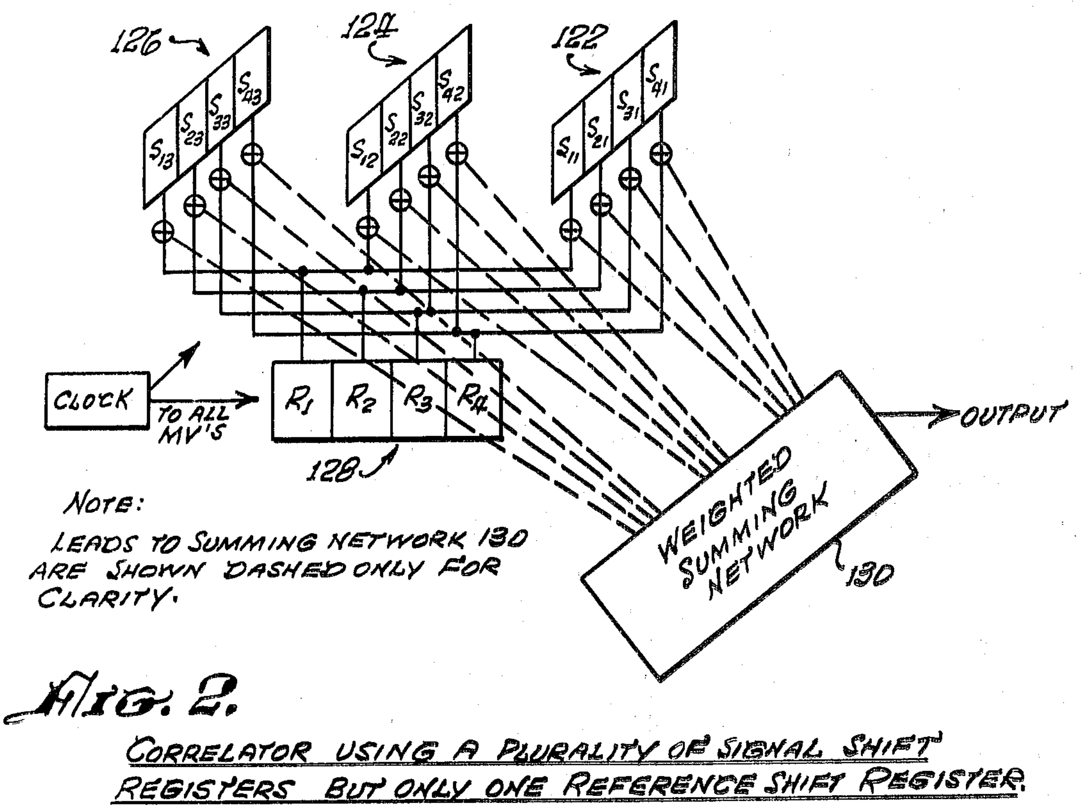
FIG. 2 is a block diagram of a correlator having a plurality of signal shift registers and one reference shift register, the outputs of whose multivibrators, one signal multivibrator and the reference multivibrator at a time, are added in a modulo-two fashion to a weighted summing network.
Figures 3, 3A, 3B, 3C:
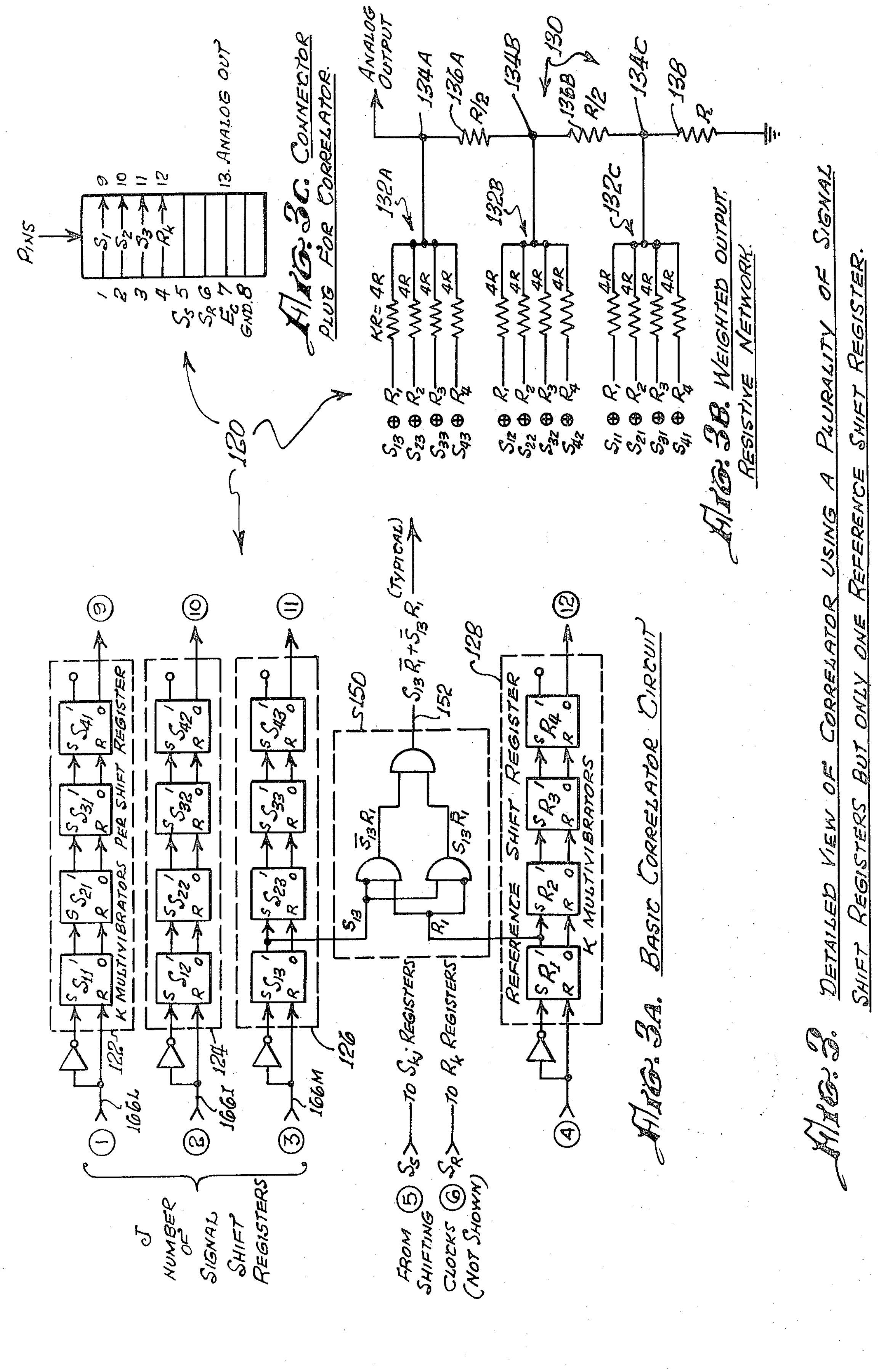

FIG. 3, comprising FIGS. 3A, 3B, and 3C, is a detailed block diagram of the correlator shown in FIG. 2.

FIG. 4 is a schematic diagram of an alternative construction for a correlator of the type described in FIGS. 2 and 3 which uses one reference register for, and synchronized with, each signal register.

FIG. 5 is a block diagram of a correlator in which both the signal and the reference shift registers are multi-digit signals, three-digit signals in this case.

Figure 6:
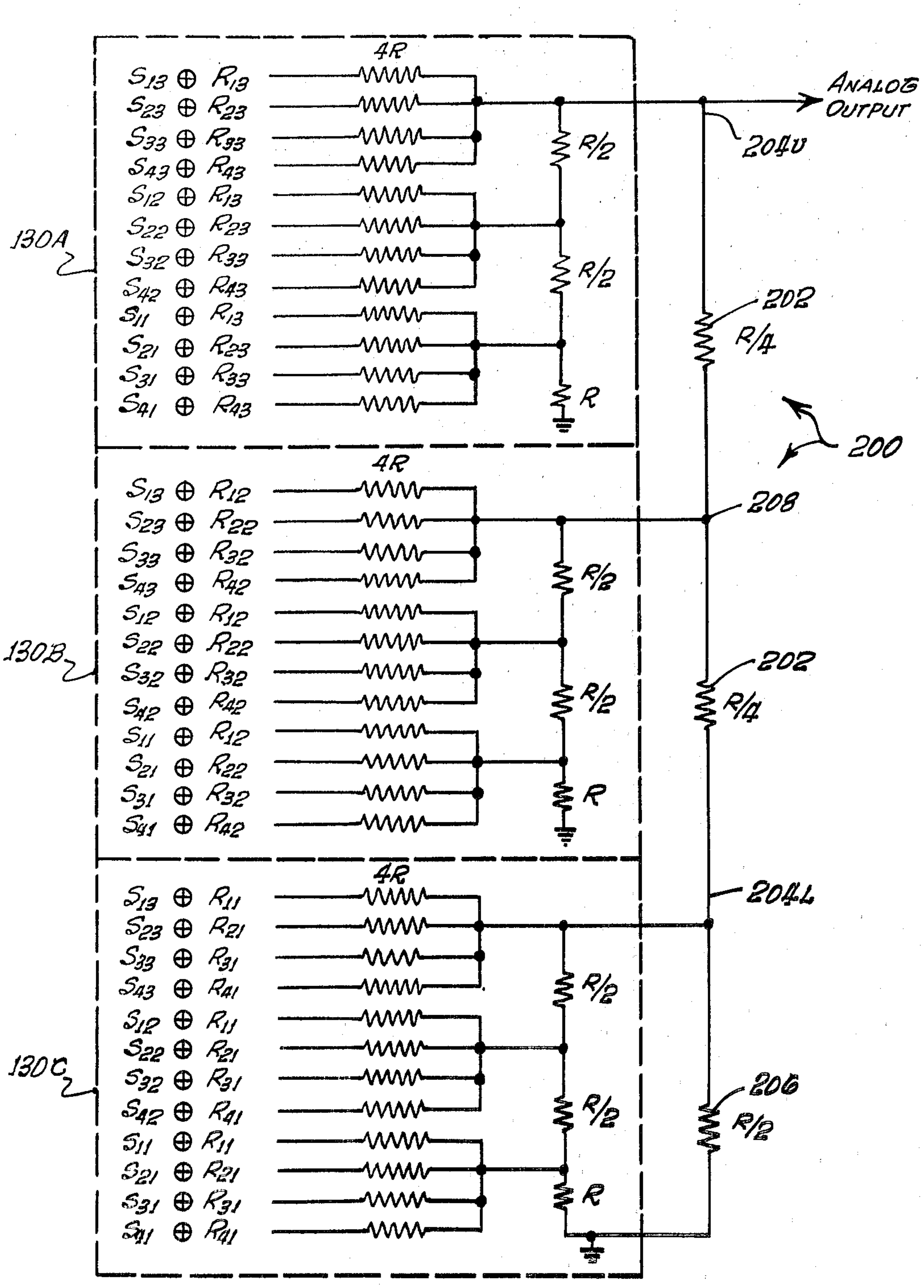

FIG. 6 is a schematic diagram of the complex resistive network which can be used with the correlator of FIG. 5, which has multilevel signal and reference shift registers.

Figure 7:
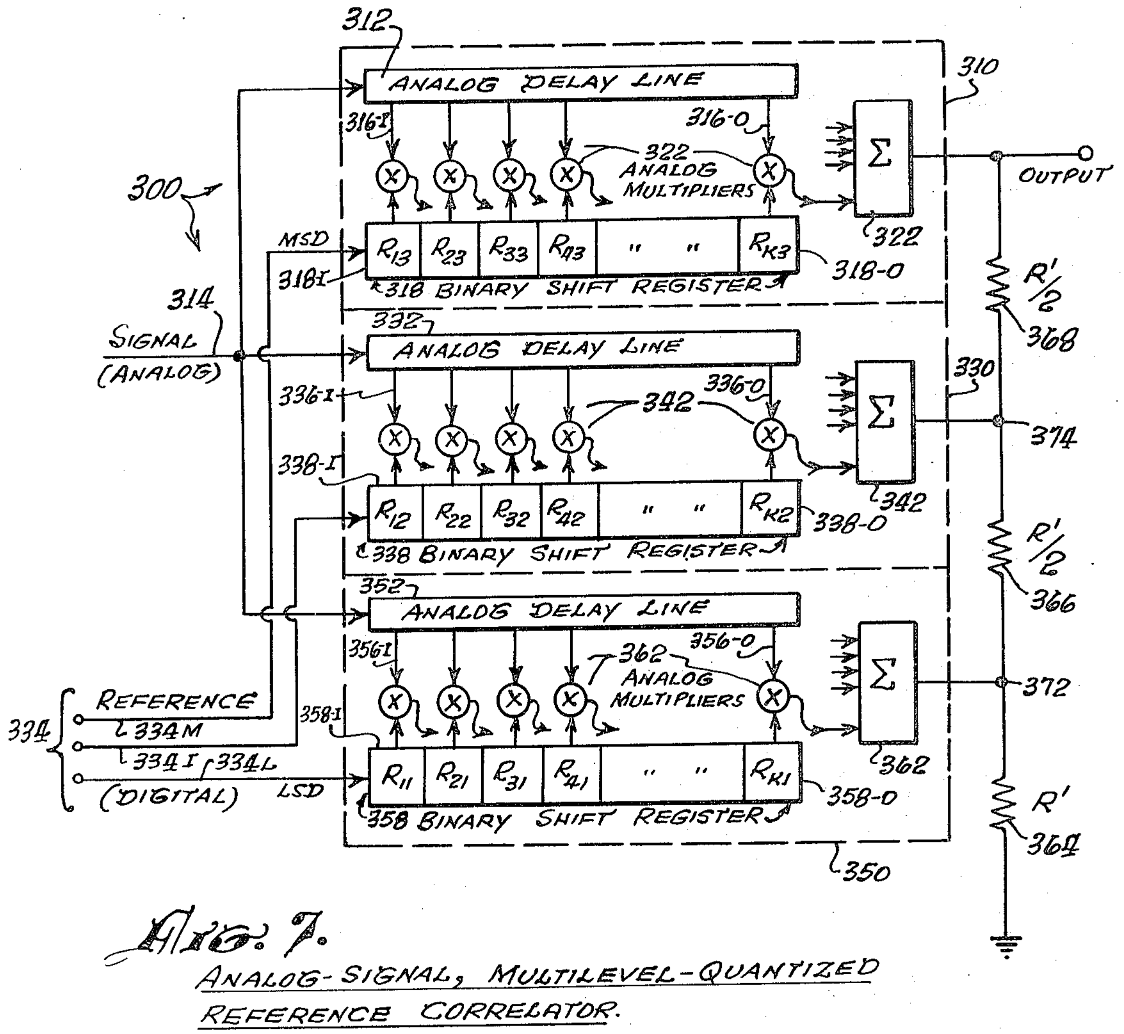

FIG. 7 is a schematic diagram of an analog signal, multilevel, quantized reference correlator.

DESCRIPTION OF THE PREFERRED EMBODIMENTS

Figure 1:
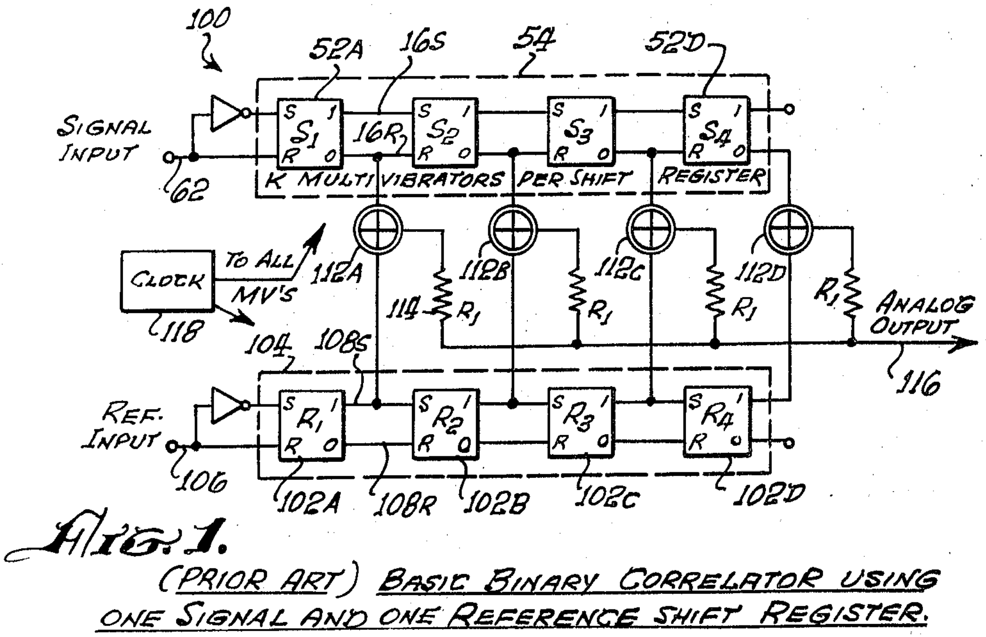
FIG. 1 is a block diagram of a prior art binary correlator using two shift registers, a signal shift register and a reference shift register, having multivibrators whose outputs are summed by multivibrator pairs in modulo-two adders, the outputs of all adders being summed together.

For background information, attention is directed to U.S. Pat. No. 3,670,151, to Lindsay et al., which issued on June 13, 1970. FIGS. 1 and 3 of the invention herein described are practically identical to FIGS. 6 and 7 of the patent just mentioned.

Referring now to the figures, beginning with FIG. 1, this figure is a block diagram of a type of correlator 100, which in addition to a signal shift register 54, comprising the set of multivibrators 52A to 52D, further comprises a second set of multivibrators 102A – 102D, substantially identical to the first-named set, forming a reference shift register 104, and connectable to an independent source of signals at input lead 106. In general, the multivibrators 102A – 102D of the reference shift register 104 would have available a set or a reset output lead 108S or 108R, but in FIG. 1, only the set output leads 108 are used.

In the embodiment 100 shown in FIG. 1, the totaling means comprises a set of modulo-two adders 112A – 112D whose two inputs are the voltages available at the output leads of corresponding multivibrators, for example, 52A and 102A. A set of output resistors 114 is connected at the output of the modulo-two adders 112A – 112D, across which output current may be developed, the other end of each resistor being connected to a common output lead 116, so that when each set of multivibrators is connected to an input signal at leads 62 and 106, a maximum output may be determined when the binary states of the multivibrators 52A – 52D of one set matches the binary states of the corresponding multivibrators 102A – 102D of the other set. The correlator 100 may further comprise a clock 118 for shifting the states of the signal multivibrators 52A – 52D, and of multivibrators 102A – 102D if required.

In one mode of operation of the correlator 100 shown in FIG. 1, the binary states of the multivibrators 102A – 102D of the reference shift registers 104 remain fixed after the input signal at input lead 106 to the reference register has switched all its multivibrators to the chosen binary states, and do not shift with subsequent clocking pulses generated by the clock 118. The incoming reference signal at lead 106 is terminated, and all shifting of the reference multivibrators 102A – 102D ceases until a new form of reference is desired, at which time a new sequence of bits is stored in the reference shift register 104. Of course, the clock 118 would continue to cause the multivibrators 52A – 52D to continue shifting with each clock pulse.

However, the embodiment 100 shown in FIG. 1 may also be used in a manner in which there are incoming streams at the inputs 62 and 106 of both shift registers, the signal shift register 54 and the reference shift register 104. The output signal at lead 116 gives an indication of the number of matches of the bits in corresponding multivibrators 52A – 52D and 102A – 102D of each shift register 54 and 104. Additionally, the embodiment 100 shown in FIG. 1 may also be constructed in a manner such that either of the incoming data streams shown routed to the inputs 62 and 106 could instead be routed to the "output" terminals at the right hand side of multivibrators 52D or 102D, so that "signal" data could be clocked in a direction opposite to that of the "reference" data, typically by alternating the clock pulses, from clock 118, applied to the two registers, 54 and 104.

Moreover, the modulo-two adders, 112A – 112D need not be connected as shown. For example, the modulo-two adders 112A – 112D could be connected to the set output leads 16S of the multivibrators 52A – 52D of the signal shift register 54, and the reset leads 108R of the multivibrators 102A – 102D of the reference shift register 104. The binary states of the multivibrators 102A – 102D of reference shift register 104 would remain as before to give the same output signal from the modulo-two adders 112A – 112D.

Furthermore, all connections to the inputs of the modulo-two adders 112A – 112D could be to the set output leads 16S and 108S only of the multivibrators 52A – 52D and 104A – 104D, or to the reset output leads 16R and 108R only, in which case the multivibrators 102A – 102D of the reference shift register 104 would have to be set to the opposite binary states from that required in the embodiment shown in FIG. 6, to obtain the same output signal at lead 116.

Since the output of a modulo-two adder is the same whether both inputs to it are high-level signals or low-level signals, as long as both inputs to a modulo-two adder are connected to like output leads from the signal and reference shift registers, 54 and 104, the configuration would be similar to one where the input leads of the modulo-two adders are connected to multivibrator output leads of one kind only.

The fact that the modulo-two adders may be connected in various ways to detect the same binary combination of states may be of great importance when using chips or integrated circuitry, since the geometry of the chip may be such that only a certain one of the interconnections is feasible or possible.

Referring now to FIG. 3, and first to FIG. 3A, therein is shown a novel correlator 120 comprising a J number of signal shift registers, 122, 124, and 126, each shift register containing a K number of serially connected multivibrators in a row all of the J number of rows of the JK multivibrators being arranged in K parallel columns(as shown, K=4).

A reference shift register 128 is substantially identical to one of the signal shift registers.

Each multivibrator of every signal and reference shift register is adapted for connection to a clocking source, not shown, by means of pins 5 and 6, for shifting the states of the multivibrators. One of the multivibrators at one end of the series, designated $S_{11}$, $S_{12}$ and $S_{13}$, and $R_1$, of each shift register is adapted for connection to a source of bilevel signals, or pulses, by means of pins 1, 2, 3 and 4, each pulse having a predetermined time duration or multiple thereof. Each multivibrator has a set and reset output lead, denoted by a "1" or "0," respectively at which appears one bilvel voltage, and at the other of which appears the other bilevel voltage, the voltages indicating the binary state of the multivibrator.

A K×J number of modulo-two adders, only one, labelled 150, of which is shown, have as inputs the set, as shown, or reset output leads of the signal and reference shift registers as determined from the logical expression $$S_{kj} \oplus R_k = S_{kj}\,\overline{R_k} + \overline{S_{kj}}\,R_k,\ 1 \leq k < K,\ 1 \leq j \leq J,$$

wherein: the unbarred terms relate to the voltage level of the bilevel signal at a set, or reset, output lead; the barred terms relate to the negative of the voltage level of the bilevel signal at a set, or reset, output lead; $S_{kj}$ relates to the specific multivibrator of the signal shift register, 122, 124, or 126, in the *k*th column and *j*th row; and $R_k$ relates to the *k*th multivibrator of the reference shift register 128.

An assembly of resistors 130 comprises J groups, J being equal to three in this case, each group, 132A, 132B, and 132C, having K resistors, each of which has a resistance of KR ohms, K being equal to 4 in this correlator 120. Each resistor of the groups 132A, 132B and 132C is connected by a first end to the output of each of the KJ modulo-2 adders 150, each resistor having a resistance of KR, the product of R times the number of multivibrators per shift register. Each resistor of a group of resistors is connected by its second end to a common junction point, 134A, 134B, or 134C.

A series connection of J-1 resistors, 136A and 136B, each resistor having a value of R/2 ohms, is connected across the junction points, 134A, 134B and 134C. One end of the series at junction point 134A comprises the analog output. A resistor 138 having a value of R ohms has one end connected to the other end of the series connection of resistors, at junction 134C, the other end being grounded.

In the interest of breadth of scope, the correlator 120 shown in FIG. 3A does not show a specific type of signal at input pins 1, 2 and 3. Generally, however, the correlator 120 of FIG. 3A would further comprise the analog - to - digital (A/D) converter 162, shown as part of the correlator 160 of FIG. 4. The converter 162 is connectable to an input analog signal 164, and has as output signals binary pulses traversing leads 166M, 166I and 166L, corresponding to a least significant digit (LDS), one or more intermediate significant digits (ISD), and a most significant digit (MSD), the total number of significant digits equaling J. The output signals comprise the inputs to the signal shift registers 122, 124, and 126.

For the embodiment 120 shown in FIG. 3A, the outputs of the shift registers of corresponding multivibrators from the reference and signal shift registers, one multivibrator from the reference shift register and one corresponding multivibrator at a time from the signal shift registers, are added together in modulo-2 fashion.

As pointed out hereinabove at the beginning of the section entitled DESCRIPTION OF THE PREFERRED EMBODIMENTS, the correlator 120 illustrated in FIG. 3 is virtually identical to the correlator (120 also) described in the patent having the U.S. Pat. No. 3,670,151. Note specifically FIGS. 6 and 7 of the patent. The main difference occurs with respect to the resistive weighting network, FIG. 3*b* of this invention, which is somewhat different than that shown in FIG. 8 of the patent. Specifically this difference should be noted : the embodiment 120 illustrated in FIG. 3 of this invention provides for a means to sum along the shift register at constant weight before summing across the shift registers with a changing weight, whereas the resistive network 120B shown in FIG. 8 of the prior art patent utilizes the reverse of this order of summation. The particular resistive weighting network 130 illustrated in FIG. 3 is suitable for weighted summing when the input data samples are represented in the following format:

$$S = -\,1/2\ 2^{M}(-1)^{S_M} + \ldots + 4(-1)^{S_3} + 2(-1)^{S_2} + (-1)^{S_1}$$

where $S_i = +1$ or 0, M = the number of significant digits used, and $i = 1, 2, \ldots$ M. Other binary or non-binary representations (e.g., mixed-radix) can also be used, and may entail only slight modifications to the weighting network 130 illustrated.

Furthermore, such a network assumes that the exclusive/OR outputs are voltage sources with respect to the values of R selected; if, instead, current sources are chosen to implement the fabrication for one reason or another, then a similar but distinct method is required to sum these current sources prior to weighting across the shift registers. Furthermore, the weighted summing represented by the middle and right-hand portions of FIG. 6 can be provided by a number of conventional methods (e.g., operational amplifiers), one of which is alluded to in FIG. 4.

Referring again to FIG. 4, this figure shows a correlator 160 which further comprises an additional number of reference shift registers, each substantially identical to the first-named reference shift register, 128 in FIG. 3A, the total number of reference shift registers, 128L, 128I and 128M, equaling the number of signal shift registers, 122, 124, and 126.

Each signal shift register, 122, 124, or 126, is paired with a reference shift register, 128L, 128I or 128M, by the KJ modulo-2 adders, 172A-D, 174A-D or 176A-D, which are connected to their corresponding respective multivibrators. All of the reference shift registers, 128L, 128I, and 128M, have a common input terminal 178, so that the same input reference signal, from input lead 164, traverses all of the reference shift registers.

Referring now to FIG. 5, this figure shows a correlator 180, which as in the correlator 160 shown in FIG. 4, comprises a first analog-to-digital (A/D) converter 162, connectable to an input analog signal 164, and a number of signal shift registers, 122, 124, and 126, each substantially identical, the total number of signal shift registers equaling the number of signal bits provided by the A/D converter, 162.

The correlator 180 also comprises a second analog-to-digital (A/D) converter 182, connectable to a second input analog signal 184, having as output signals, on leads 186L, 186I and 186M, binary pulses corresponding to a least significant digit (LSD), a number of intermediate significant digits (ISD) which is not necessarily the same as in the first A/D converter 162, and a most significant digit (MSD), the output signals comprising the inputs to the reference shift registers, 123, 125 and 127.

The correlator 180 further comprises a plurality of modulo-2 adders 188, so that the total number is equal to the product of the number of signal shift registers, (e.g., 122, 124, and 126) by the number of reference shift registers, (e.g., 123, 125 and 127) by K (numer of adders per register). Corresponding multivibrators of the signal and reference shift registers, comprise the inputs to their respective modulo-2 adders, the totality being designated by block 188, the outputs of which feed into a summing network 200.

FIG. 6 shows a representative weighted summing network 200 in more detail. It consists of a plurality of assemblies of resistors, 130A, 130B and 130C, each assembly substantially identical to, and connected to modulo-2 adders in a manner similar as, the first-named assembly of resistors 130 in FIG. 3B, the total number of assemblies equaling the number of reference shift registers, three in FIG. 5, labelled 123, 125, and 127. Connected to the assemblies of resistors 130A, 130B and 130C is a second series connection of N-1 resistors, both labelled 202 in FIG. 6, each resistor having a value of R/4 ohms, one end, the upper end 204U, of the series, at which the analog output is taken, being connected to the ungrounded end of one of the assembly of resistors 130A.

A grounded resistor 206 having a value of R/2 ohms has its ungrounded end connected to the other end, the lower end 204L, of the second series connection of resistors 202 and to another assembly of resistors 130C.

The ungrounded end of each of the other asemblies of resistors, assembly 130B in FIG. 6, is connected to one of the junction points 208 between the resistors 202 having a value of R/4 ohms.

FIG. 7 shows an analog signal multi-level quantized reference correlator comprising a J number, three in FIG. 7, of analog delay lines, 312, 332 and 352, all having a common input 314 and each having K taps, including an input and an output tap, 316-I, 336-I, 356-I, and 316-O, 336-O, 356-O.

A J number of reference shift registers. 318, 338 and 358, each containing a A K number of serially connected multivibrators, including an input multivibrator, 318-I, 338-I, or 358-I, and an output multivibrator, 318-O, 338-O, or 358-O. Each multivibrator has a set and reset output lead (refer to FIG. 3A), at one of which appears one bilevel voltage, and at the other of which appears the other bilevel voltage, the voltages indicating the binary state of the multivibrator. The input multivibrator 318-I, 338-I and 358-I is connectable to a source of signals 334, generally a stream of bilevel signals, or pulses, each pulse having a predetermined time duration or multiple thereof. One input multivibrator 318-I is connectable by lead 334M, to a stream of pulses corresponding to a most significant digit (MSD), another, by lead 334L, to a least significant digit, and the other K-2 input multivibrators, only one, 338-I shown, being connectable, by lead 334I, to streams of pulses corresponding to digits having values intermediate to these two. Each multivibrator of every reference shift register, 318, 338 and 358, is connectable to a clocking source, not shown in FIG. 7, for shifting the states of the multivibrators in synchronism with the streams of pulses.

A JK number of analog multiplier circuits, 322, 342 and 362, one connected between corresponding taps of the delay line and multivibrators of the shift registers, e.g., between an input multivibrator 318-I and an input tap 316-I, are included in the correlator 300. A multiplier circuit may comprise a voltage converter, whose input is the bilevel output voltage of a multivibrator, which converts either of the two bilevel voltages into either of two output voltages of equal magnitude but opposite polarity, and a multiplier, whose inputs comprise the output voltage of the voltage converter and the output voltage of one of the taps, the output voltage of the multiplier being the product of the two input voltages.

As the following discussion will show, a voltage converter is not absolutely essential, if a suitable voltage reference be chosen. To simplify the discussion, the multivibrator is assumed to comprise two tubes.

With the usual values of direct-current plate supply and grid voltages used in flip-flop circuits, in one state the plate output voltage of either tube is at one level, and in the other state the plate output voltage of the same tube is at another, significantly different, level. Ordinarily, the two plate output voltage levels are of the same polarity. However, inasmuch as the voltage reference level in any electronic circuit can be set at any of various levels, intermediate between the most positive and most negative points in the flip-flop circuit, if the reference voltage level of the flip-flop circuit be set at least approximately half way between the two different plate output voltage levels which are attained with a zero reference level, then in one state the plate output voltage of either tube will be of one polarity, and in the other state the plate output voltage of the same tube will be of the other polarity.

The correlator 300 of FIG. 7 also comprises an N number of signal summers, 322, 342 and 362, one associated with each of the delay lines, 312, 332, and 352, and each of the shift registers, 318, 338 and 358, each signal summer having as inputs the outputs of its K associated analog multiplier circuits, 322, 342 and 362.

A resistor 364 having a resistance of R′ ohms, has one of its ends grounded, the other end being connected to that signal summer 362 associated with the least significant digit.

The correlator 300 also comprises a N-1 number (N-1 = 2 in FIG. 7) of serially connected resistors, 366 and 368, each having a resistance of R′/2 ohms, one end of the series being connected to the ungrounded end 372 of the grounded resistor 364, the other end of the series of resistors being connected to the output of that signal summer 322 associated with the most significant digit, the other N-2 (=1 in FIG. 7) signal summers being connected to the N-2 junction points 374 of the other N-1 resistors having a value of R′/2.

The embodiment 300 shown in FIG. 7 can be seen to be directly analogous to the second structure described in the SUMMARY OF THE INVENTION. Instead of using N modules of the type shown in FIG. 2, one can utilize N modules in which the J shift registers of FIG. 2 have been replaced by a single tapped analog delay line, and the J group of modulo-two adders have been replaced by J group of plus-minus multipliers. The embodiment 300 is particularly appropriate for utilizing charge-coupled devices or acousto-surface-wave devices as analog-vs-multilevel-digital correlators.

Obviously many modifications and variations of the present invention are possible in the light of the above teachings. It is therefore to be understood that within the scope of the appended claims the invention may be practiced otherwise than as specifically described.

What is claimed is:

1. A correlator comprising:

a J number of signal shift registers, each shift register containing a K number of serially connected multivibrators in a row, all of the J number of rows of the JK multivibrators being arranged in K parallel columns;

a reference shift register, substantially identical to one of the signal shift registers;

each multivibrator of every signal and reference shift register being adapted for connection to a clocking source, for shifting the states of the multivibrators;

one of the multivibrators at one end of the series of each shift register being adapted for connection to a source of bilevel signals, or pulses, each pulse having a predetermined time duration or multiple thereof;

each multivibrator, of every signal and reference shift register having a set and reset output lead, at one of which appears one bilevel voltage, and at the other of which appears the other bilevel voltage, the voltages indicating the binary state of the multivibrator;

a K×J number of modulo-two adders whose inputs are the set or reset output leads of the signal and reference shift registers as determined from the logical expression $$S_{kj} \oplus R_k = S_{kj} \overline{R}_k + \overline{S}_{kj} R_k,\ 1 \leq k \leq K,\ 1 \leq j \leq J, \text{ where}$$

the unbarred terms relate to the voltage level of the bilevel signal at a set, or reset, output lead;

the barred terms relate to the negative of the voltage level of the bilevel signal at a set, or reset, output lead;

$S_{kj}$ relates to the specific multivibrator of the signal register in the $k$th column and $j$th row; and $R_k$ relates to the $k$th multivibrator of the reference shift register;

an assembly of resistors comprising J groups, each group having K resistors, each of which has a resistance of KR ohms;

each resistor being connected by a first end to the output of each of the KJ modulo-2 adders;

each resistor of a group of resistors being connected by its second end to a common junction point;

a series connection of J-1 resistors, each resistor having a value of R/2 ohms, connected across the junction points, one end of the series comprising an analog output; and a resistor having a value of R ohms, one end being connected to the other end of the series connection of resistors, the other end being grounded.

2. The correlator according to claim 1, further comprising:

an analog-to-digital (A/D) converter, connectable to an input analog signal, having as output signals binary pulses corresponding to a least significant digit (LSD); a number  0 of intermediate significant digits (ISD), and a most significant digit (MSD), the total number of significant digits equaling J, the output signals comprising the inputs to the signal shift registers; and wherein the outputs of the shift registers of corresponding multivibrators from the reference and signal shift registers, one multivibrator from the reference shift register and one corresponding multivibrator at a time from the signal shift register being added together in modulo-2 fashion.

3. The correlator according to claim 1, further comprising:

an analog-to-digital (A/D) converter, connectable to an input analog signal having as output signals binary pulses correspoding to a least significant digit (LSD), a number  0 of intermediate significant digits (ISD), and a most significant digit (MSD), the total number of significant digits equaling J, the output signals comprising the inputs to the signal shift registers;

an additional number of reference shift registers, each substantially identical to the first-named reference shift register, the total number of reference shift registers equaling the number of signal shift registers;

each signal shift register being paired with a reference shift register by the KJ modulo-2 adders which are connected to their respective multivibrators;

all of the reference shift registers being connected to a common input terminal, so that the same input reference signal traverses all of the reference shift registers.

4. The correlator according to claim 1, further comprising:

a first analog-to-digital (A/D) converter, connectable to an input analog signal, having as output signals binary pulses corresponding to a least significant digit (LSD), a number  0 of intermediate significant digits (ISD) and a most significant digit (MSD), the total number of digits equaling J, the output signals comprising the inputs to the signal shift registers;

an additional number of reference shift registers, each substantially identical to the first-named reference shift register, the total number of reference shift registers not necessarily equal to the number of signal shift registers;

a plurality of assemblies of resistors, each assembly substantially identical to, and connected to modulo-2 adders in a manner similar as, the first-named assembly of resistors, the total number of assemblies equaling the number of reference shift registers N;

a second series connection of N-1 resistors, each resistor having a value of R/4 ohms, one end of the series, comprising the analog output, being connected to the ungrounded end of one of the assembly of resistors;

a grounded resistor having a value of R/2 ohms, the ungrounded end being connected to the other end of the second series connection of resistors and to another assembly of resistors;

the ungrounded end of each of the other J-2 assemblies of resistors being connected to one of the junction points between the resistors having a value of R/4 ohms;

a second analog-to-digital (A/D) converter, connectable to a second input analog signal, having as output signals binary pulses corresponding to a least significant digit (LSD), a number of intermediate significant digits (ISD) not necessarily the same as in the first A/D converter, and a most significant digit (MSD), the output signals comprising the inputs to the reference shift registers;

an additional plurality of modulo-2 addders, so that the total number is equal to the product of the number of signal shift registers by the number of reference shift registers times the number per register, corresponding multivibrators of the signal and reference shift registers comprising the inputs to their respective modulo-2 adders.

5. A correlator comprising:

an N number of analog delay lines, all having a common input and each having K taps, including an input and an ouptut tap;

an N number of reference shift registers, each containing a K number of serially connected multivibrators; including an input multivibrator and an output multivibrator;

each multivibrator having a set and reset output lead, at one of which appears one bilevel voltage, and at the other of which appears one bilevel voltage, the voltages indicating the binary state of the multivibrator;

one of the multivibrators at one end of the series of each shift register, the input multivibrator, being connectable to a source of signals, generally a stream of bilevel signals, or pulses, each pulse having a predetermined time duration or multiple thereof; one input multivibrator being connectable to a stream of pulses corresponding to a most significant digit (MSD), another to a least significant digit, and the other K-2 input multivibrators being connectable to streams of pulses corresponding to digits having values intermediate to these two;

each multivibrator of every reference shift register being connectable to a clocking source for shifting the states of the multivibrators in synchronism with the streams of pulses;

an NK number of analog multiplier circuits, one connected between corresponding taps of the delay line and multivibrators of the shift registers, e.g., between an input multivibrator and an input tap, the multiplier circuit comprising:

a voltage converter, whose input is the bilevel output voltage of a multivibrator, which converts either of two output voltages of equal magnitude but opposite polarity; and a multiplier, whose inputs comprise the output voltage of the voltage converter and the output voltage of one of the taps, the output voltage of the multiplier being the product of the two input voltages;

a J number of signal summers, one associated with each of the delay lines and each of the shift registers, each signal summer having as inputs the outputs of its K associated analog multiplier circuits;

a resistor having a resistance of R ohms, one of whose ends is grounded, the other end being connected to that signal summer associated with the least significant digit;

an N-1 number of serially connected resistors, each having a resistance of R/2 ohms, one end of the series being connected to the ungrounded end of the grounded resistor, the other end of the series being connected to the output of that signal summer associated with the most significant digit, the other N-2 signal summers being connected to the N-2 junction points of the other N-1 resistors having a value of ½R.

* * * * *